(12) United States Patent
Nishi

(10) Patent No.: US 9,405,498 B2
(45) Date of Patent: Aug. 2, 2016

(54) COMMUNICATION APPARATUS, TERMINAL APPARATUS, IMAGE PROCESSING SYSTEM, AND COMMUNICATION METHOD

(71) Applicant: FUJI XEROX CO., LTD., Tokyo (JP)

(72) Inventor: Eiji Nishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/680,579

(22) Filed: Apr. 7, 2015

(65) Prior Publication Data

US 2016/0004497 A1    Jan. 7, 2016

(30) Foreign Application Priority Data

Jul. 4, 2014   (JP) ................. 2014-138903

(51) Int. Cl.
*H04N 1/40* (2006.01)
*G06F 3/12* (2006.01)
*H04W 76/00* (2009.01)

(52) U.S. Cl.
CPC ............ *G06F 3/1292* (2013.01); *G06F 3/1204* (2013.01); *G06F 3/1236* (2013.01); *H04W 76/00* (2013.01)

(58) Field of Classification Search
USPC ............ 358/1.14, 1.15, 468; 455/452.6, 41.1, 455/41.2, 41.3
See application file for complete search history.

(56) References Cited

U.S. PATENT DOCUMENTS

| | | | |
|---|---|---|---|
| 8,090,387 B1* | 1/2012 | Batson, Jr. ............ | H04W 4/02 455/414.2 |
| 2003/0149526 A1* | 8/2003 | Zhou ..................... | G01S 5/0027 701/408 |
| 2004/0002326 A1* | 1/2004 | Maher ............... | H04M 3/42178 455/418 |
| 2004/0192221 A1 | 9/2004 | Matsunaga | |
| 2008/0074488 A1* | 3/2008 | Thompson .......... | H04L 12/1822 348/14.08 |
| 2011/0028180 A1* | 2/2011 | Sawai ................... | H04W 52/46 455/522 |
| 2011/0124286 A1* | 5/2011 | Tanaka ................ | H04W 76/023 455/41.1 |
| 2013/0190018 A1* | 7/2013 | Mathews .............. | H04W 4/023 455/456.6 |
| 2014/0280544 A1* | 9/2014 | Aldereguia ............ | H04L 51/20 709/204 |

FOREIGN PATENT DOCUMENTS

| | | |
|---|---|---|
| JP | 2002-094523 A | 3/2002 |
| JP | 2004-304399 A | 10/2004 |
| JP | 2010-211722 A | 9/2010 |

* cited by examiner

*Primary Examiner* — Jerome Grant, II
(74) *Attorney, Agent, or Firm* — Sughrue Mion, PLLC

(57) ABSTRACT

A communication apparatus includes a first communication unit, a second communication unit, and a communication-apparatus-side controller. The first communication unit wirelessly communicates with plural terminal apparatuses, the number of which is less than or equal to a predetermined maximum number of connections allowed. The second communication unit wirelessly communicates with a connection-requesting terminal apparatus that attempts to wirelessly communicate with the first communication unit. The communication-apparatus-side controller transmits, to the connection-requesting terminal apparatus via the second communication unit, information indicating that wireless communication via the first communication unit is not available in a case where the number of connections established for wireless communication via the first communication unit has reached the predetermined maximum number of connections allowed.

8 Claims, 8 Drawing Sheets

COMMUNICATION APPARATUS, TERMINAL APPARATUS, IMAGE PROCESSING SYSTEM, AND COMMUNICATION METHOD

CROSS-REFERENCE TO RELATED APPLICATIONS

This application is based on and claims priority under 35 USC 119 from Japanese Patent Application No. 2014-138903 filed Jul. 4, 2014.

BACKGROUND (i) Technical Field

The present invention relates to a communication apparatus, a terminal apparatus, an image processing system, and a communication method.

(ii) Related Art

For example, there are cases where a user wishes to connect a terminal apparatus to a communication apparatus by using wireless communication based on Wireless Fidelity (Wi-Fi) or the like. In such cases, the terminal apparatus and the communication apparatus may be automatically and easily connected to each other by causing the terminal apparatus to transmit and receive connection conditions via wireless communication such as near-field communication (NFC) in advance.

SUMMARY

According to an aspect of the invention, there is provided a communication apparatus including a first communication unit, a second communication unit, and a communication-apparatus-side controller. The first communication unit wirelessly communicates with plural terminal apparatuses, the number of which is less than or equal to a predetermined maximum number of connections allowed. The second communication unit wirelessly communicates with a connection-requesting terminal apparatus that attempts to wirelessly communicate with the first communication unit. The communication-apparatus-side controller transmits, to the connection-requesting terminal apparatus via the second communication unit, information indicating that wireless communication via the first communication unit is not available in a case where the number of connections established for wireless communication via the first communication unit has reached the predetermined maximum number of connections allowed.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail below with reference to the accompanying drawings.

System Configuration

Figure 1:
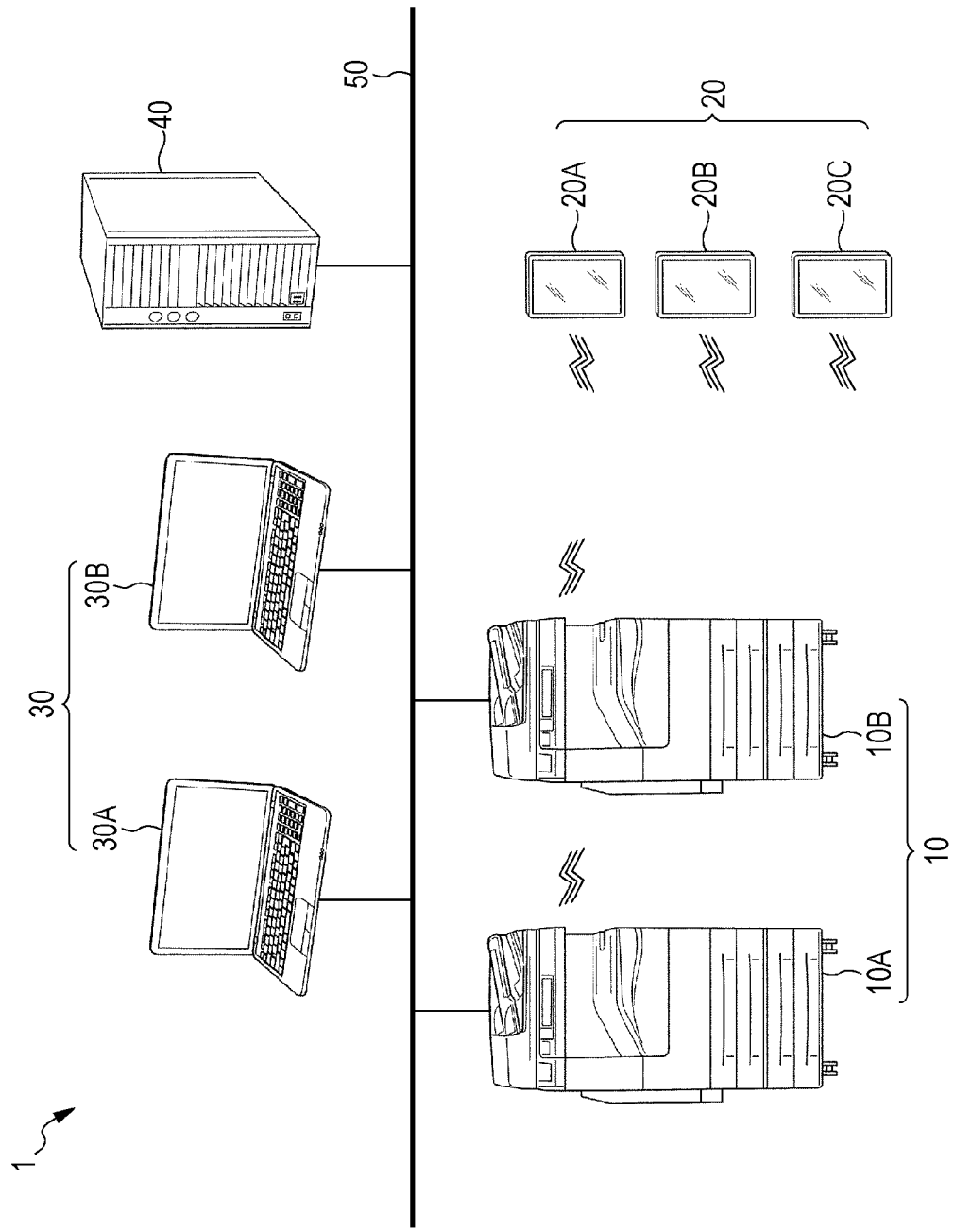
FIG. 1 illustrates an example of an overall configuration of an image processing system according to an exemplary embodiment.

An overall configuration of an image processing system 1 according to an exemplary embodiment will be described. FIG. 1 illustrates an example of an overall configuration of the image processing system 1 according to the present exemplary embodiment. As illustrated in FIG. 1, the image processing system 1 includes an image processing apparatus 10A, an image processing apparatus 10B, a mobile terminal 20A, a mobile terminal 20B, a mobile terminal 20C, an operation terminal 30A, an operation terminal 30B, and a management server 40. Wireless communication is performed among the image processing apparatus 10A, the image processing apparatus 10B, the mobile terminal 20A, the mobile terminal 20B, and the mobile terminal 20C. In addition, the image processing apparatus 10A, the image processing apparatus 10B, the operation terminal 30A, the operation terminal 30B, and the management server 40 are connected to a network 50 and communicate with one another via the network 50.

The image processing apparatuses 10A and 10B are illustrated in FIG. 1; however, the image processing apparatuses 10A and 10B are referred to as image processing apparatuses 10 if distinction between them is not required. Likewise, the mobile terminals 20A, 20B, and 20C are illustrated in FIG. 1; however, the mobile terminals 20A, 20B, and 20C are referred to as mobile terminals 20 if distinction between them is not required. Further, the operation terminals 30A and 30B are illustrated in FIG. 1; however, the operation terminals 30A and 30B are referred to as operation terminals 30 if distinction between them is not required. Two image processing apparatuses 10 are provided in the example illustrated in FIG. 1; however, three or more image processing apparatuses 10 may be provided. Further, three mobile terminals 20 are provided in the example illustrated in FIG. 1; however, four or more mobile terminals 20 may be provided. In addition, two operation terminals 30 are provided in the example illustrated in FIG. 1; however, three or more operation terminals 30 may be provided.

Each of the image processing apparatuses 10 is, for example, an apparatus having functions such as a scan function, a print function, a copy function, and a facsimile function, and forms an image on a recording medium such as paper and outputs the resulting recording medium. Each of the image processing apparatuses 10 receives a print job from the mobile terminals 20 and the operation terminals 30 and performs a printing process in accordance with the print job that has been received. A print job includes image data to be printed and a control instruction that describes settings used in the printing process, and is data that serves as a unit of a printing process performed by the image processing apparatus 10.

Each of the mobile terminals 20 is a mobile computer apparatus used when an instruction to execute various functions is given to the image processing apparatuses 10. For example, an apparatus such as a smartphone, a tablet personal computer (PC), or a notebook PC may be used as the mobile terminal 20.

Each of the operation terminals 30 is a computer apparatus used by a user to view and edit a document file. For example, an apparatus such as a notebook PC or a desktop PC may be used as the operation terminal 30. In addition, a mobile computer apparatus such as a smartphone may also be used as the operation terminal 30.

The management server 40 is a computer apparatus that stores various kinds of data processed by the image processing system 1.

The network 50 is a communication medium used for communication of information among apparatuses such as the image processing apparatuses 10, the operation terminals 30, and the management server 40. The network 50 is, for example, a wired local area network (LAN).

In the present exemplary embodiment, short-range wireless communication (e.g., NFC) and wireless communication based on another communication standard (e.g., Wi-Fi Direct (registered trademark)) that achieves a speed higher than that achieved with the short-range wireless communication are performed between the image processing apparatuses 10 and the mobile terminals 20. NFC is a wireless communication standard in which a communication range is limited to approximately ten centimeters. In addition, Wi-Fi Direct is a standard that enables direct communication between Wi-Fi (registered trademark) terminals. According to Wi-Fi Direct, each Wi-Fi device has a function for operating as an access point. An access point is a relay device that wirelessly relays communication between devices. Specifically, according to Wi-Fi Direct, one of plural Wi-Fi devices that participate in a network substantially operates as an access point, and direct communication is performed between the device serving as the access point and the other Wi-Fi devices.

According to Wi-Fi Direct, each communication apparatus that participates in a certain network is defined as a peer-to-peer (P2P) device, and the network is defined as a P2P group. A P2P device that substantially operates as an access point in a P2P group is defined as a P2P group owner. P2P devices other than the P2P group owner are defined as P2P clients. Each P2P device exchanges a signal with another P2P device to detect a P2P device that serves as a Wi-Fi Direct connection destination candidate. In this way, the P2P group owner is selected from among plural P2P devices.

In the present exemplary embodiment, a description will be given on the assumption that the image processing apparatuses 10 serve as the P2P group owners. In addition, according to Wi-Fi Direct, a maximum number of P2P clients that are allowed to connect to the P2P group owner at one time is generally set. In the present exemplary embodiment, it is assumed that the maximum number for the number of mobile terminals 20 that are allowed to connect to each of the image processing apparatuses 10 using Wi-Fi Direct at one time (hereinafter, referred to as the number of simultaneous connections) is three.

Hardware Configuration of Image Processing Apparatus 10

Figure 2:
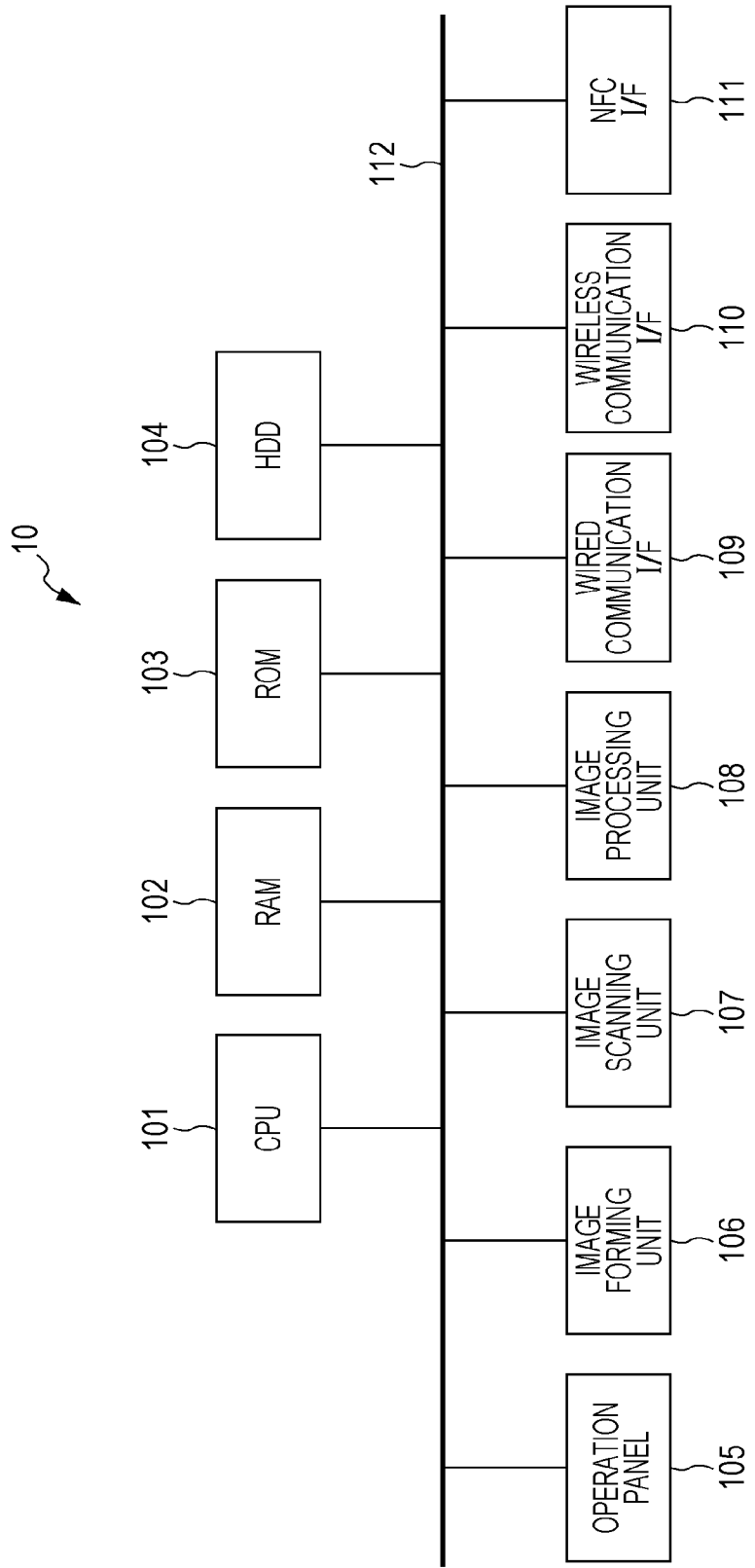
FIG. 2 illustrates an example of a hardware configuration of an image processing apparatus.

A hardware configuration of the image processing apparatus 10 will be described next. FIG. 2 illustrates an example of a hardware configuration of the image processing apparatus 10. As illustrated in FIG. 2, the image processing apparatus 10 includes a central processing unit (CPU) 101, a random access memory (RAM) 102, a read only memory (ROM) 103, a hard disk drive (HDD) 104, an operation panel 105, an image forming unit 106, an image scanning unit 107, an image processing unit 108, a wired communication interface (I/F) 109, a wireless communication I/F 110, and an NFC I/F 111, which are connected to a bus 112 and exchange data with one another via the bus 112.

The CPU 101 executes various kinds of software such as an operating system (OS) and applications. The RAM 102 is a memory that is used as, for example, a work memory of the CPU 101. The ROM 103 is a memory that stores, for example, various programs to be executed by the CPU 101. The CPU 101 loads the various programs stored in the ROM 103 or the like into the RAM 102 and executes the various programs so as to implement the functions of the image processing apparatus 10.

The HDD 104 is, for example, a magnetic disk device that stores image data or the like used in an image forming operation performed by the image forming unit 106.

The programs to be executed by the CPU 101 may be pre-stored in the ROM 103 or may be provided after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 101 via the network 50, for example.

The operation panel 105 is, for example, a touch panel that displays various kinds of information and accepts an operation input from a user. The operation panel 105 includes a display that displays various kinds of information and a position detector sheet that detects a position touched with a finger or a stylus. Any detector, such as a detector that detects a touched position based on a pressure caused by the touch or based on a static electricity of an object that has touched, may be used to detect the touched position. In addition, a display and an input device such as a keyboard may be used in place of the touch panel. Note that the operation panel 105 need not be a touch panel.

The image forming unit 106 forms an image on a recording medium. For example, a printer such as an electrophotographic printer that transfers toner on a photoconductor onto a recording medium so as to form an image on the recording medium or an inkjet printer that ejects ink onto a recording medium so as to form an image on the recording medium may be used as the image forming unit 106.

The image scanning unit 107 scans an image on a recording medium and generates image data representing the image that has been scanned. The image scanning unit 107 is, for example, a scanner such as of a charge coupled device (CCD) system in which reflecting light of light that has been radiated onto an original from a light source is size-reduced by a lens and is received by CCDs or of a contact image sensor (CIS) system in which reflecting light of light that has been sequentially radiated onto an original from a light-emitting diode (LED) light source is received by a CIS.

The image processing unit 108 performs image processing such as color correction and gradation correction on image data input thereto and generates image data that has undergone the image processing.

The wired communication I/F 109 functions as a communication interface that enables transmission and reception of various kinds of data to and from the operation terminals 30 and the management server 40 via the network 50.

The wireless communication I/F 110 includes an antenna used for Wi-Fi Direct wireless communication with the mobile terminals 20 and functions as a communication interface that enables transmission and reception of various kinds of data to and from the mobile terminals 20.

The NFC I/F 111 includes an antenna used for NFC communication with the mobile terminals 20 and functions as a communication interface that enables transmission and reception of various kinds of data to and from the mobile terminals 20.

Hardware Configuration of Mobile Terminal 20

Figure 3:
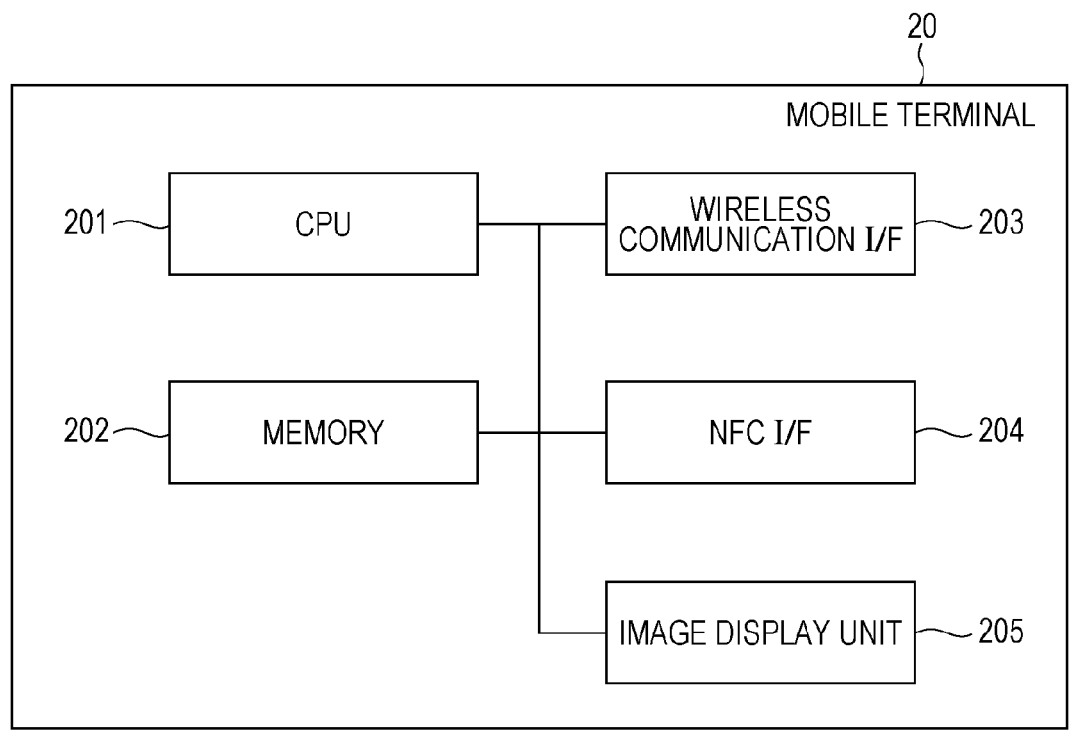
FIG. 3 illustrates an example of a hardware configuration of a mobile terminal.

FIG. 3 illustrates an example of a hardware configuration of the mobile terminal 20.

As illustrated in FIG. 3, the mobile terminal 20 includes a CPU 201 and a memory 202. The CPU 201 executes various kinds of software such as an OS and applications. The memory 202 includes a storage area in which the various kinds of software, data used for execution of the various kinds of software, and so on are stored.

Programs to be executed by the CPU 201 may be pre-stored in the memory 202 or may be provided to the CPU 201 after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 201 via the Internet, for example.

The mobile terminal 20 further includes a wireless communication I/F 203 and an NFC I/F 204 that enable wireless communication between the mobile terminal 20 and an external device, and an image display unit 205 that displays an image.

The wireless communication I/F 203 has a configuration and a function that are similar to those of the wireless communication I/F 110 (see FIG. 2) of the image processing apparatus 10. In addition, the NFC I/F 204 has a configuration and a function that are similar to those of the NFC I/F 111 (see FIG. 2) of the image processing apparatus 10.

The image display unit 205 is, for example, a touch panel. Accordingly, the image display unit 205 includes a liquid crystal panel and a position detector (not illustrated) that detects a position of the liquid crystal panel that is touched by an object such as a human finger or a stylus when the liquid crystal panel is touched by the object. The touch panel used in the present exemplary embodiment is not limited to any particular type, and a touch panel of any given type such as a resistive film type or an electrostatic capacitive type may be used.

The mobile terminal 20 may include, for example, an HDD or a flash memory as a memory. An HDD or a flash memory stores data to be input to various kinds of software and data output from the various kinds of software, for example. The mobile terminal 20 may further include an input device, such as a keyboard or a mouse.

In the above-described image processing system 1, the mobile terminals 20 and the operation terminals 30 transmit a print job to the image processing apparatuses 10 via the network 50 or Wi-Fi Direct wireless communication. In this way, printing is performed by the image processing apparatuses 10.

The management server 40 is capable of managing print jobs to be executed by the image processing apparatus 10, rearranging the print jobs in an appropriate order, and transmitting the print jobs to the image processing apparatus 10. In this case, the management server 40 functions as a print server. The management server 40 is capable of managing files so as to allow the files to be shared among the mobile terminals 20 and the operation terminals 30. In this case, the management server 40 functions as a file server.

In the present exemplary embodiment, there are two methods for connecting the mobile terminal (terminal apparatus) 20 to the image processing apparatus 10 by using Wi-Fi Direct.

One method is a method in which the mobile terminal 20 is operated directly to connect the mobile terminal 20 to the image processing apparatus 10. According to this method, a user of the mobile terminal 20 causes the mobile terminal 20 to display access points currently available for connection on the image display unit 205, for example. Then, the user selects a service set identifier (SSID) corresponding to the image processing apparatus 10 from among the displayed access points and inputs a password or the like. After the user has been authenticated, a connection is established. Note that authentication is not requested in some cases.

The other method is a method that uses the NFC I/F 111. According to this method, a user of the mobile terminal 20 pre-sets connection conditions in order to connect the mobile terminal 20 to the image processing apparatus 10 by using Wi-Fi Direct. The NFC I/F 204 of the mobile terminal 20 and the NFC I/F 111 of the image processing apparatus 10 wirelessly communicate with each other so as to transmit the connection conditions to the image processing apparatus 10. This consequently causes the image processing apparatus 10 to perform authentication of the mobile terminal 20. In this way, the mobile terminal 20 is connected to the image processing apparatus 10 by using Wi-Fi Direct.

According to this method, the mobile terminal 20 and the image processing apparatus 10 first use NFC to perform wireless communication, via which the connection conditions are transmitted and received by the NFC I/F 204 and the NFC I/F 111. After the mobile terminal 20 has been authenticated, the communication mode is switched from NFC to Wi-Fi Direct (handover).

Thereafter, the mobile terminal 20 and the image processing apparatus 10 wirelessly communicate with each other by using Wi-Fi Direct via the wireless communication I/F 203 and the wireless communication I/F 110, respectively. Specifically, the image processing apparatus 10 performs wireless communication via the wireless communication I/F 110 instead of the NFC I/F 111 as a result of the handover. The mobile terminal 20 performs wireless communication via the wireless communication I/F 203 instead of the NFC I/F 204 as a result of the handover. That is, this method (NFC connection handover technology) causes the mobile terminal 20 and the image processing apparatus 10 to be connected to each other by using Wi-Fi Direct in response to the mobile terminal 20 being placed over or on the NFC I/F 111 of the image processing apparatus 10. This method thus makes it easier for a user to establish a connection and improves user friendliness.

However, as described above, the maximum number of mobile terminals 20 that are allowed to connect to the image processing apparatus 10 is set when Wi-Fi Direct is used. In the above-described example, the maximum number is set to three. For this reason, if the number of mobile terminals 20 that are already connected to the image processing apparatus 10 has reached the maximum number of connections allowed in Wi-Fi Direct when the mobile terminal 20 attempts to establish a connection to the image processing apparatus 10, the new connection is not allowed.

In the related art, the user of the mobile terminal 20 is not informed of such a situation and thus is kept waiting until a timeout occurs, for example.

In contrast, in the present exemplary embodiment, the image processing apparatus 10 and the mobile terminal 20 are configured to have the following functional configurations so as to inform a user of the mobile terminal 20 that no Wi-Fi Direct connection is available.

Description regarding Functional Configurations of Image Processing Apparatus 10 and Terminal Apparatus 20

Figure 4:
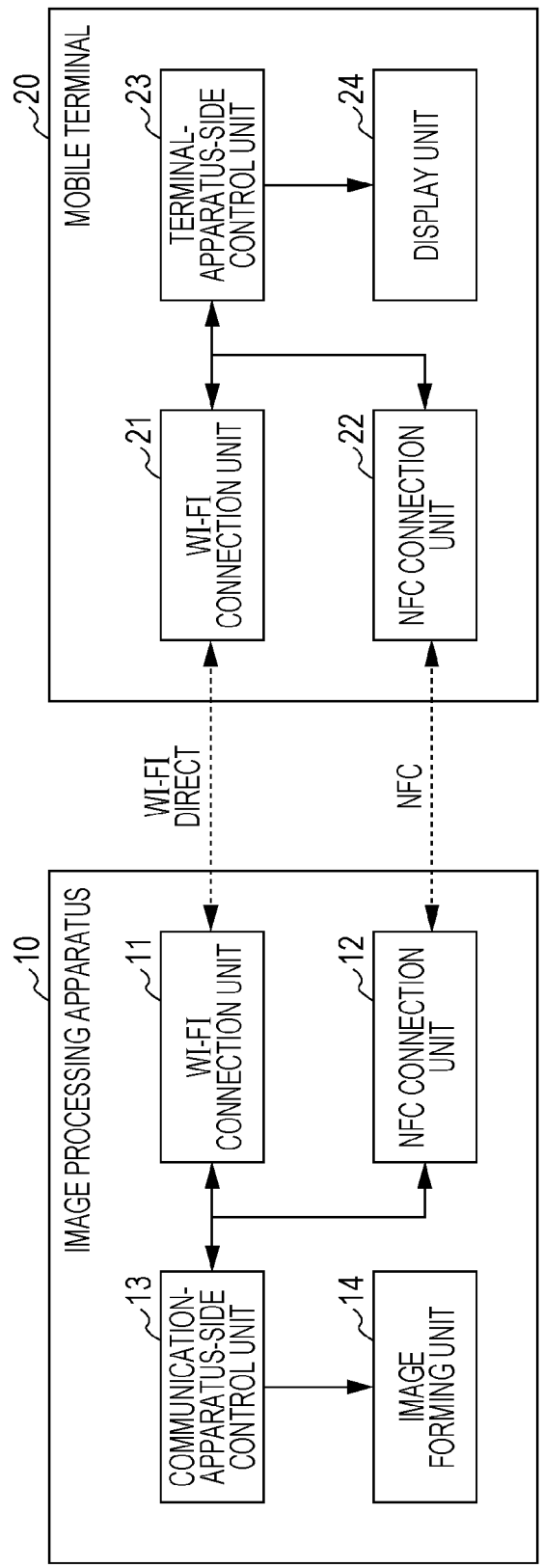
FIG. 4 is a block diagram illustrating an example of functional configurations of the image processing apparatus and the mobile terminal.

FIG. 4 is a block diagram illustrating an example of functional configurations of the image processing apparatus 10 and the mobile terminal 20.

As illustrated in FIG. 4, the image processing apparatus 10 includes a Wi-Fi connection unit 11, an NFC connection unit 12, a communication-apparatus-side control unit 13, and an image forming unit 14. The mobile terminal 20 includes a Wi-Fi connection unit 21, an NFC connection unit 22, a terminal-apparatus-side control unit 23, and a display unit 24. Note that FIG. 4 selectively illustrates functions related to the present exemplary embodiment from among various functions of the image processing apparatus 10 and the mobile terminal 20. In addition, as illustrated in FIG. 4, the image processing apparatus 10 may be considered as a communication apparatus in the present exemplary embodiment.

The Wi-Fi connection unit 11, which is an example of a first communication unit, is a functional unit that performs Wi-Fi Direct wireless communication in the image processing apparatus 10. The Wi-Fi connection unit 11 corresponds to the wireless communication I/F 110 illustrated in FIG. 2. Specifically, the Wi-Fi connection unit 11 has a function that enables transmission and reception of information via wireless communication to and from plural mobile terminals 20, the number of which is less than or equal to a predetermined maximum number of connections allowed.

The NFC connection unit 12, which is an example of a second communication unit, is a functional unit that performs NFC wireless communication in the image processing apparatus 10. The NFC connection unit 12 corresponds to the NFC I/F 111 illustrated in FIG. 2. Specifically, the NFC connection unit 12 has a function that enables transmission and reception of information concerning connection conditions via wireless communication to and from the mobile terminal 20 (which is also referred to as a connection-requesting terminal apparatus) that attempts to wirelessly communicate with the Wi-Fi connection unit 11. The information concerning connection conditions is used to establish a connection to the Wi-Fi connection unit 11 using the pre-set connection conditions. The information concerning connection conditions transmitted from the mobile terminal 20 includes, for example, a media access control (MAC) address or a serial number of the mobile terminal 20. In addition, the information concerning connection conditions transmitted from the image processing apparatus 10 includes, for example, a MAC address or an SSID of the image processing apparatus 10.

The communication-apparatus-side control unit 13, which is an example of a communication-apparatus-side controller, controls the Wi-Fi connection unit 11, the NFC connection unit 12, and the image forming unit 14. The communication-apparatus-side control unit 13 corresponds to a combination of the CPU 101, the RAM 102, the ROM 103, the HDD 104, and the image processing unit 108 illustrated in FIG. 2.

The image forming unit 14 is a functional unit that forms an image. The image forming unit 14 corresponds to the image forming unit 106 illustrated in FIG. 2. In the present exemplary embodiment, image information used by the image forming unit 14 to form an image is received not by the NFC connection unit 12 but by the Wi-Fi connection unit 11. That is, information transmitted or received by the Wi-Fi connection unit 11 via wireless communication includes the image information used by the image forming unit 14 to form an image. This is because Wi-Fi Direct generally has a higher communication speed than NFC and image information, which is likely to contain a large amount of data, is transmitted at a higher rate when Wi-Fi Direct is used than when NFC is used.

The Wi-Fi connection unit 21, which is an example of a third communication unit, is a functional unit that performs Wi-Fi Direct communication in the mobile terminal 20. The Wi-Fi connection unit 21 corresponds to the wireless communication I/F 203 illustrated in FIG. 3. Specifically, the Wi-Fi connection unit 21 has a function that enables transmission and reception of information to and from the image processing apparatus 10 via a wireless communication network (a Wi-Fi Direct communication network in this case) for which a maximum number of connections allowed is predetermined.

The NFC connection unit 22, which is an example of a fourth communication unit, is a functional unit that performs NFC communication in the mobile terminal 20. The NFC connection unit 22 corresponds to the NFC I/F 204 illustrated in FIG. 3. Specifically, the NFC connection unit 22 has a function that enables transmission and reception of information concerning connection conditions via wireless communication in order to establish a connection between the Wi-Fi connection unit 21 and the image processing apparatus 10 by using the pre-set connection conditions.

The terminal-apparatus-side control unit 23, which is an example of a terminal-apparatus-side controller, controls the Wi-Fi connection unit 21 and the NFC connection unit 22. According to the aforementioned NFC connection handover technology, the terminal-apparatus-side control unit 23 has a function for switching wireless communication from wireless communication via the NFC connection unit 22 to wireless communication via the Wi-Fi connection unit 21. The terminal-apparatus-side control unit 23 corresponds to a combination of the CPU 201 and the memory 202 illustrated in FIG. 3.

The display unit 24 is a functional unit that displays an image and corresponds to the image display unit 205 illustrated in FIG. 3.

Description Regarding Communication-Apparatus-Side Control Unit 13

The communication-apparatus-side control unit 13 will be described in more detail.

First Exemplary Embodiment

First, the communication-apparatus-side control unit 13 according to a first exemplary embodiment will be described.

In the first exemplary embodiment, in the case where the number of connections established for wireless communication via the Wi-Fi connection unit 11 (i.e., the wireless communication I/F 110) has reached the maximum number of connections allowed, the communication-apparatus-side control unit 13 transmits, via the NFC connection unit 12 (i.e., the NFC I/F 111), information (warning information) indicating that wireless communication via the Wi-Fi connection unit 11 (i.e., the wireless communication I/F 110) is not available to the mobile terminal 20 (i.e., the connection-requesting terminal apparatus) that attempts, via the NFC connection unit 12 (i.e., the NFC I/F 111), to perform wireless communication via the Wi-Fi connection unit 11 (i.e., the wireless communication I/F 110).

Specifically, the NFC connection unit 12 sets information indicating that Wi-Fi Direct is busy (the number of available connections=0) in a message based on the NFC data exchange format (NDEF) used in NFC communication and transmits the NDEF message to the mobile terminal 20.

The NFC connection unit 22 (i.e., the NFC I/F 204) of the mobile terminal 20 receives this warning information. Then, the terminal-apparatus-side control unit 23 of the mobile terminal 20 displays a message indicating, for example, "No Wi-Fi Direct connection is currently available because all available Wi-Fi Direct connections are in use" on the display unit 24 (i.e., the image display unit 205).

In the related art, the warning information is not transmitted from the image processing apparatus 10. Thus, the mobile terminal 20 is unable to detect a situation where no Wi-Fi Direct connection is available. In such a case, the mobile terminal 20 just displays, for example, "Connecting" on the display unit 24 (i.e., the image display unit 205), and a user of the mobile terminal 20 is kept waiting until a timeout occurs, for example.

In contrast, in the present exemplary embodiment, the warning information is transmitted from the image processing apparatus 10, and the mobile terminal 20 displays a message based on this warning information on the display unit 24. Accordingly, the user friendliness of the mobile terminal 20 improves.

Operations performed by the image processing apparatus 10 and the mobile terminal 20 according to the first exemplary embodiment will be described next.

Figure 5:
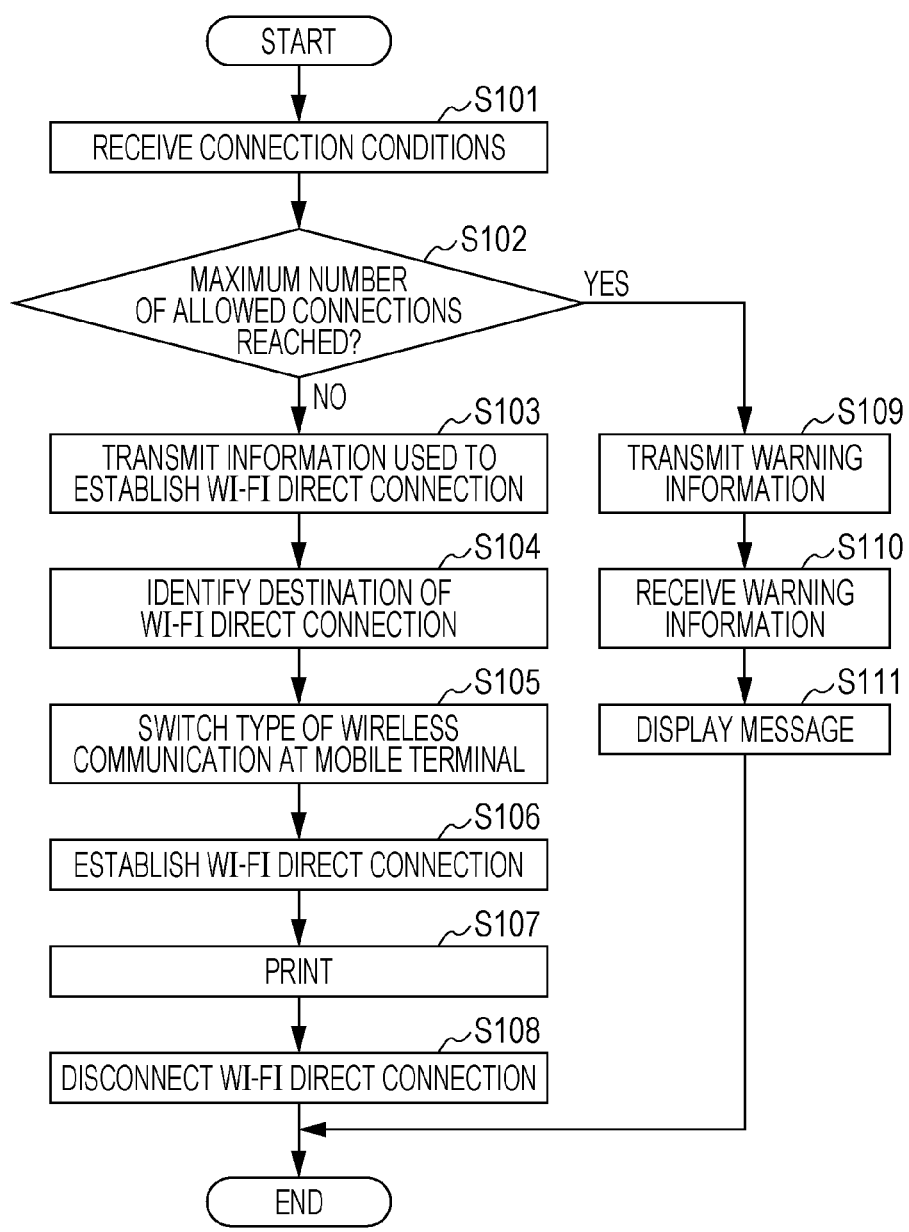
FIG. 5 is a flowchart describing operations performed by the image processing apparatus and the mobile terminal in a first exemplary embodiment.

FIG. 5 is a flowchart describing operations performed by the image processing apparatus 10 and the mobile terminal 20 in the first exemplary embodiment.

The operations performed by the image processing apparatus 10 and the mobile terminal 20 will be described below with reference to FIGS. 4 and 5.

When a user wishes to print an image represented by print data stored in the mobile terminal 20 by using the image processing apparatus 10, the user goes to the location where the image processing apparatus 10 is installed and places the mobile terminal 20 (i.e., the connection-requesting terminal apparatus) on the NFC connection unit 12 (i.e., the NFC I/F 111) to cause the connection-requesting terminal apparatus to touch the NFC connection unit 12. In response to this action, NFC wireless communication is automatically initiated between the NFC connection unit 22 (i.e., the NFC I/F 204) of the connection-requesting terminal apparatus and the NFC connection unit 12. Then, information concerning connection conditions that are pre-set by the connection-requesting terminal apparatus and that are used to establish a connection to the Wi-Fi connection unit 11 (i.e., the wireless communication I/F 110) is transmitted and received. Consequently, the NFC connection unit 12 receives the information concerning connection conditions (step S101). At this time, the NFC connection unit 12 of the image processing apparatus 10 operates in a card emulation mode and returns a response upon receipt of a data acquisition request from the NFC connection unit 22 of the connection-requesting terminal apparatus that operates in a reader/writer mode. At this time, the information concerning connection conditions is transmitted and received in accordance with the NDEF, which is a data format generally used in NFC communication.

At this time, the communication-apparatus-side control unit 13 of the image processing apparatus 10 determines whether the number of Wi-Fi Direct connections established has reached the maximum number of connections allowed (step S102).

If the number of Wi-Fi Direct connections established has not reached the maximum number of connections allowed (NO in step S102), the communication-apparatus-side control unit 13 transmits information used to establish a Wi-Fi Direct connection to the connection-requesting terminal apparatus via the NFC connection unit 12 (step S103). This information is, for example, a MAC address or an SSID of the image processing apparatus 10.

The NFC connection unit 22 of the connection-requesting terminal apparatus receives this information. The terminal-apparatus-side control unit 23 then identifies a Wi-Fi Direct connection destination from this information (step S104). Then, the terminal-apparatus-side control unit 23 switches wireless communication from wireless communication via the NFC connection unit 22 to wireless communication via the Wi-Fi connection unit 21 (i.e., the wireless communication I/F 203) (step S105).

Then, the Wi-Fi connection unit 21 transmits a connection request to the Wi-Fi connection unit 11. A connection is established between the Wi-Fi connection unit 21 of the connection-requesting terminal apparatus and the Wi-Fi connection unit 11 of the image processing apparatus 10 by using the connection conditions. As a result, the connection-requesting terminal apparatus and the image processing apparatus 10 are connected to each other by Wi-Fi Direct (step S106).

The user then operates the connection-requesting terminal apparatus or the image processing apparatus 10 to input an instruction to cause the image processing apparatus 10 to perform printing. As a result, image data is transmitted from the Wi-Fi connection unit 21 to the Wi-Fi connection unit 11 by using Wi-Fi Direct, and printing is performed by the image forming unit 14 of the image processing apparatus 10 (step S107).

After printing has been finished, the user removes or detaches the connection-requesting terminal apparatus from the NFC connection unit 12 (i.e., the NFC I/F 111). As a result, the NFC connection unit 12 and the connection-requesting terminal apparatus are no longer able to wirelessly communicate with each other. Thus, the communication-apparatus-side control unit 13 disconnects the Wi-Fi Direct connection that has been established between the connection-requesting terminal apparatus and the image processing apparatus 10 (step S108). The connection may be disconnected when the printing is finished.

If the number of Wi-Fi Direct connections established has reached the maximum number of connections allowed (YES in step S102), the image processing apparatus 10 transmits, to the connection-requesting terminal apparatus via the NFC connection unit 12, information containing warning information which indicates that Wi-Fi Direct wireless communication is not available (step S109).

The NFC connection unit 22 of the connection-requesting terminal apparatus receives this information containing the warning information (step S110). The terminal-apparatus-side control unit 23 of the connection-requesting terminal apparatus then displays a message indicating "No Wi-Fi Direct connection is available" on the display unit 24 (i.e., the image display unit 205) (step S111).

Second Exemplary Embodiment

The communication-apparatus-side control unit 13 according to a second exemplary embodiment will be described next.

In the second exemplary embodiment, the communication-apparatus-side control unit 13 performs a reservation process so as to allow the connection-requesting terminal apparatus to preferentially use a line for (Wi-Fi Direct) wireless communication via the Wi-Fi connection unit 11 when the line becomes available after transmitting the warning information.

In the case where the mobile terminal 20 (i.e., the connection-requesting terminal apparatus) attempts, via the NFC connection unit 12, to establish a connection to the image processing apparatus 10, a user of the mobile terminal 20 is in front of the image processing apparatus 10. That is, it is highly likely that the user wishes to use the image processing apparatus 10 immediately and urgently. Thus, the user is desirably prioritized and allowed to use the image processing apparatus 10. In the related art, however, when the number of Wi-Fi Direct connections established has reached the maximum number of connections allowed, the user is required to manually cause the connection-requesting terminal apparatus to touch the NFC connection unit 12 (i.e., the NFC I/F 111) again and again until a Wi-Fi Direct communication line becomes available as a result of disconnection of a connection between another mobile terminal 20 and the image processing apparatus 10. In addition, even if a line becomes available, another mobile terminal 20 sometimes establishes a connection to the image processing apparatus 10 before the connection-requesting terminal apparatus does.

Accordingly, in the present exemplary embodiment, the reservation process is performed so as to allow the connection-requesting terminal apparatus that uses the NFC connection unit 12 to preferentially use the line when a line becomes available. With the reservation process, a situation where another terminal apparatus 20 establishes a connection to the image processing apparatus 10 before the connection-requesting terminal apparatus does is avoided.

Operations performed by the image processing apparatus 10 and the mobile terminal 20 according to the second exemplary embodiment will be described next.

Figure 6:
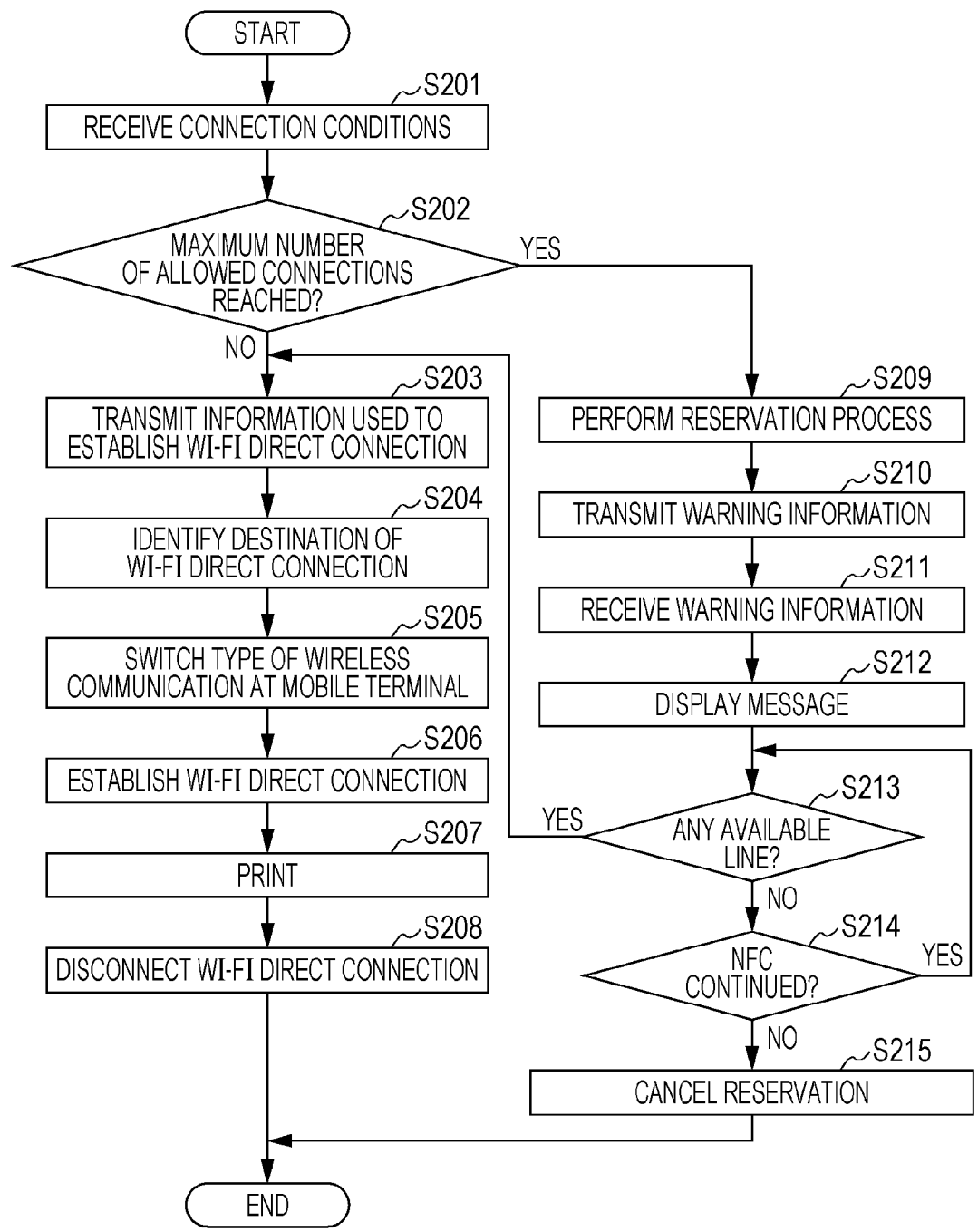
FIG. 6 is a flowchart describing operations performed by the image processing apparatus and the mobile terminal in a second exemplary embodiment.

FIG. 6 is a flowchart describing operations performed by the image processing apparatus 10 and the mobile terminal 20 in the second exemplary embodiment.

The operations performed by the image processing apparatus 10 and the mobile terminal 20 will be described below with reference to FIGS. 4 and 6.

Because steps S201 to S208 of FIG. 6 are similar to steps S101 to S108 of FIG. 5, a description thereof is omitted and a description starts from step S209.

If the number of connections established has reached the maximum number of connections allowed (YES in step S202), the communication-apparatus-side control unit 13 performs the above-described reservation process (step S209). The reservation process uses identification information of the connection-requesting terminal apparatus, such as the MAC address or the serial number of the connection-requesting terminal apparatus. Such information may be acquired when information concerning connection conditions is transmitted and received in step S201.

Steps S210 to S212 are similar to steps S109 to S111 of FIG. 5.

After step S212, the communication-apparatus-side control unit 13 monitors whether a line becomes available as a result of disconnection of a Wi-Fi Direct connection between another mobile terminal 20 and the image processing apparatus 10 (step S213).

If there is no available line (NO in step S213), the communication-apparatus-side control unit 13 monitors whether wireless communication with the connection-requesting terminal apparatus via the NFC connection unit 12 is continued (step S214). If there is no available line, the terminal-apparatus-side control unit 23 of the connection-requesting terminal apparatus may display a message indicating, for example, "Wi-Fi Direct connection is busy. Please wait for a while. Processing will continue upon finding an available line." on the display unit 24 (i.e., the image display unit 205).

If the wireless communication with the connection-requesting terminal apparatus via the NFC connection unit 12 is continued (YES in step S214), the process returns to step S213.

If the wireless communication with the connection-requesting terminal apparatus is no longer performed (NO in step S214), the communication-apparatus-side control unit 13 cancels the reservation (step S215). That is, this case corresponds to the case where the user has removed and detached the connection-requesting terminal apparatus from the NFC connection unit 12 (i.e., the NFC I/F 111). In this case, it is considered that the user no longer wishes to perform printing using the image processing apparatus 10, and thus the reservation is no longer needed.

If a line becomes available (YES in step S213), the communication-apparatus-side control unit 13 transmits, to the connection-requesting terminal apparatus using the NFC connection unit 12, information indicating that a Wi-Fi Direct line has become available. The process then proceeds to step S203, and printing is performed by the image forming unit 14 of the image processing apparatus 10. In the case where a connection request is received from another mobile terminal 20, the communication-apparatus-side control unit 13 rejects the connection request. Whether the sender of the connection request is the connection-requesting terminal apparatus or another mobile terminal 20 is identifiable based on the identification information.

Third Exemplary Embodiment

The communication-apparatus-side control unit 13 according to a third exemplary embodiment will be described next.

In the second exemplary embodiment, the user is required to be in front of the image processing apparatus 10 and to keep the connection-requesting terminal apparatus touching the NFC connection unit 12 (i.e., the NFC I/F 111) until a Wi-Fi Direct line becomes available. In this case, other users recognize that the image processing apparatus 10 is currently reserved by seeing the user who is in front of the image processing apparatus 10; however, it is often inconvenient that the user is unable to leave the image processing apparatus 10.

In contrast to the second exemplary embodiment, the third exemplary embodiment allows the user to detach the connection-requesting terminal apparatus from the NFC connection unit 12 (i.e., the NFC I/F 111) and leave the image processing apparatus 10 under a specific condition.

In the third exemplary embodiment, the communication-apparatus-side control unit 13 receives a connection request from the connection-requesting terminal apparatus via Wi-Fi Direct at predetermined intervals T after the preservation process has been performed for the connection-requesting terminal apparatus. Then, when a line becomes available, the communication-apparatus-side control unit 13 allows this connection-requesting terminal apparatus to preferentially use the line.

In this case, a connection request is received not by NFC but by Wi-Fi Direct. Thus, the user is permitted to detach the connection-requesting terminal apparatus from the NFC connection unit 12 (i.e., the NFC I/F 111) and leave the image processing apparatus 10. The reservation is maintained if the user is within a communication range of Wi-Fi Direct. When a Wi-Fi Direct line becomes available, the connection-requesting terminal apparatus preferentially uses this line.

Operations performed by the image processing apparatus 10 and the mobile terminal 20 according to the third exemplary embodiment will be described next.

Figure 7:
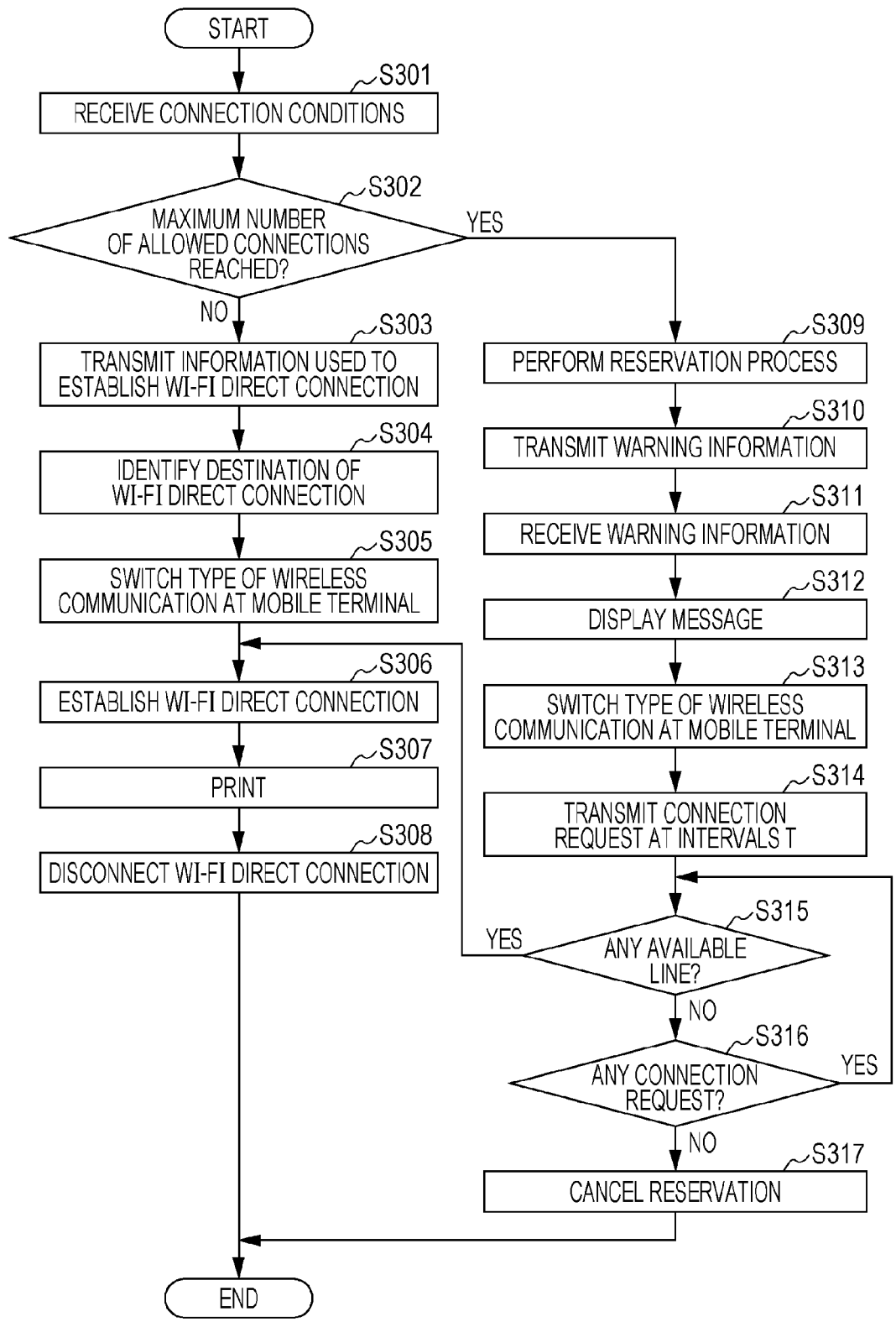
FIG. 7 is a flowchart describing operations performed by the image processing apparatus and the mobile terminal in a third exemplary embodiment.

FIG. 7 is a flowchart describing operations performed by the image processing apparatus 10 and the mobile terminal 20 in the third exemplary embodiment.

The operations performed by the image processing apparatus 10 and the mobile terminal 20 will be described below with reference to FIGS. 4 and 7.

Because steps S301 to S312 of FIG. 7 are similar to step S201 to S212 of FIG. 6, a description thereof is omitted and a description starts from step S313.

After step S312, the terminal-apparatus-side control unit 23 of the connection-requesting terminal apparatus switches wireless communication from wireless communication via the NFC connection unit 22 to wireless communication via the Wi-Fi connection unit 21 (step S313).

The terminal-apparatus-side control unit 23 of the connection-requesting terminal apparatus then transmits, using the Wi-Fi connection unit 21, a connection request to the image processing apparatus 10 at predetermined intervals T (step S314). That is, the connection-requesting terminal apparatus keeps performing a connection retry to the image processing apparatus 10. The predetermined interval T may be acquired from the image processing apparatus 10 when information concerning connection conditions is transmitted and received in step S301. At this time, the connection-requesting terminal apparatus and the image processing apparatus 10 are not connected by Wi-Fi Direct but the connection request is received by the Wi-Fi connection unit 11 of the image processing apparatus 10 even in such a state.

The communication-apparatus-side control unit 13 monitors whether a line becomes available as a result of disconnection of a Wi-Fi Direct connection between another mobile terminal 20 and the image processing apparatus 10 (step S315).

If there is no available line (NO in step S315), the communication-apparatus-side control unit 13 of the image processing apparatus 10 monitors whether a connection request is received from the connection-requesting terminal apparatus at the predetermined intervals T (step S316).

If a connection request is no longer received from the connection-requesting terminal apparatus at the predetermined intervals T (NO in step S316), the communication-apparatus-side control unit 13 cancels the reservation (step S317). That is, this case corresponds to the case where the user has left the communication range of Wi-Fi Direct, and it is considered that the user no longer wishes to perform printing using the image processing apparatus 10. In such a case, a connection request is no longer received from the connection-requesting terminal apparatus, and thus the reservation is canceled. Note that the communication-apparatus-side control unit 13 determines that a connection request is no longer received at the predetermined intervals T in the case where a connection request is not received within a time period T+α (where, α is a predetermined time period) from the last connection request, for example.

If a connection request is received at the predetermined intervals T (YES in step S316), the process returns to step S315.

If a line becomes available (YES in step S315), the communication-apparatus-side control unit 13 transmits, to the connection-requesting terminal apparatus using the Wi-Fi connection unit 11, information indicating that a Wi-Fi Direct line has become available. The process then proceeds to step S306, and printing is performed by the image forming unit 14 of the image processing apparatus 10. The information indicating that a Wi-Fi Direct line has become available may be transmitted as a response to a connection request from the connection-requesting terminal apparatus. In the case where a connection request is received from another mobile terminal 20, the communication-apparatus-side control unit 13 rejects the connection request. Whether the sender of the connection request is the connection-requesting terminal apparatus or another mobile terminal 20 is identifiable based on the identification information.

Fourth Exemplary Embodiment

The communication-apparatus-side control unit 13 according to a fourth exemplary embodiment will be described next.

In the fourth exemplary embodiment, the communication-apparatus-side control unit 13 disconnects a wireless connection to the connected mobile terminal 20 in accordance with a predetermined rule. In this way, the communication-apparatus-side control unit 13 prepares a line connected preferentially to the connection-requesting terminal apparatus when the number of connections established for (Wi-Fi Direct) wireless connection via the Wi-Fi connection unit 11 has reached the maximum number of connections allowed.

Examples of the predetermined rule include the following conditions (1) to (4). The communication-apparatus-side control unit 13 selects the mobile terminal 20 that satisfies any one of the conditions and disconnects the connection to the selected mobile terminal 20.

(1) A mobile terminal 20 that does not use a print job transfer protocol in communication, that is, a mobile terminal 20 that is not transferring print data of a print job (2) A mobile terminal 20 that has the minimum amount of data exchanged via communication during a past predetermined period (3) A mobile terminal 20 that has the oldest Wi-Fi Direct connection start time (4) A mobile terminal 20 that has the longest no-communication period up to the present time point The conditions (1) to (4) allow selection of the mobile terminal 20 for which the influence of disconnection of a Wi-Fi Direct connection is minimal. Note that the communication-apparatus-side control unit 13 may notify the disconnection-target mobile terminal 20 of disconnection.

As described above, in the fourth exemplary embodiment, a line connected preferentially to the connection-requesting terminal apparatus that has a high urgency and that is desirably prioritized and allowed to use the image processing apparatus 10 is prepared.

Operations performed by the image processing apparatus 10 and the mobile terminal 20 according to the fourth exemplary embodiment will be described next.

Figure 8:
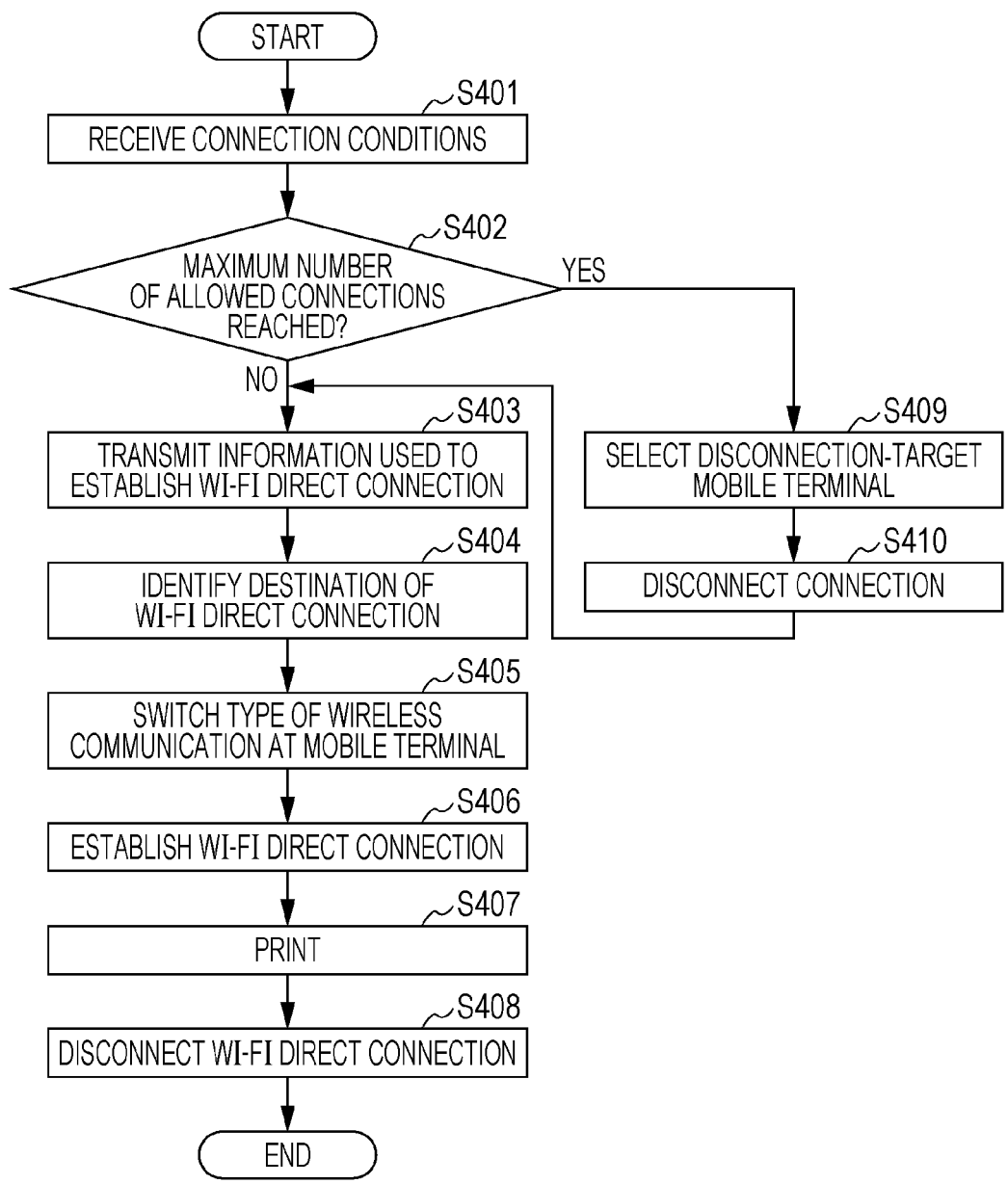
FIG. 8 is a flowchart describing operations performed by the image processing apparatus and the mobile terminal in a fourth exemplary embodiment.

FIG. 8 is a flowchart describing operations performed by the image processing apparatus 10 and the mobile terminal 20 in the fourth exemplary embodiment.

The operations performed by the image processing apparatus 10 and the mobile terminal 20 will be described below with reference to FIGS. 4 and 8.

Because steps S401 to S408 of FIG. 8 are similar to steps S101 to S108 of FIG. 5, a description thereof is omitted and a description starts from step S409.

If the number of connections established has reached the maximum number of connections allowed (YES in step S402), the communication-apparatus-side control unit 13 selects, from among the mobile terminals 20 that are already connected to the image processing apparatus 10, the mobile terminal 20 that satisfies any of the conditions (1) to (4) (step S409).

The communication-apparatus-side control unit 13 then disconnects a Wi-Fi Direct connection to the selected mobile terminal 20 (step S410).

The process then proceeds to step S403, and printing is performed by the image forming unit 14 of the image processing apparatus 10.

In the exemplary embodiments described in detail above, wireless communication is performed between the mobile terminal 20 and the image processing apparatus 10 by using Wi-Fi Direct. However, the wireless communication scheme is not limited to this particular scheme, and any wireless communication scheme with a limited number of allowed connections may be used.

In addition, in the exemplary embodiments described in detail above, the mobile terminal 20 performs wireless communication by using Wi-Fi Direct. However, the apparatus is not limited to the mobile terminal 20, and the operation terminal 30 (see FIG. 1) may perform wireless communication.

Further, in the exemplary embodiments described in detail above, the image processing apparatus 10 that forms an image serves as a communication apparatus according to the exemplary embodiments. However, the communication apparatus is not limited to the image processing apparatus 10 and may be an apparatus of another type.

While the exemplary embodiments have been described above, the technical scope of the present invention is not limited to the scope of the above-described exemplary embodiments. It is obvious from the attached claims that embodiments obtained by making various alterations and improvements to the exemplary embodiments are also within the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
at least one processor configured to execute:
a first communication unit that wirelessly communicates with a plurality of terminal apparatuses, the number of which is less than or equal to a predetermined maximum number of connections allowed;
a second communication unit that wirelessly communicates with a connection-requesting terminal apparatus that attempts to wirelessly communicate with the first communication unit; and
a communication-apparatus-side controller that transmits, to the connection-requesting terminal apparatus via the second communication unit, information indicating that wireless communication via the first communication unit is not available in a case where the number of connections established for wireless communication via the first communication unit has reached the predetermined maximum number of connections allowed.

2. The communication apparatus according to claim 1, wherein in a case where the communication-apparatus-side controller transmits the information indicating that wireless communication via the first communication unit is not available, the communication-apparatus-side controller performs a reservation process so as to allow the connection-requesting terminal apparatus to preferentially use a line for wireless communication via the first communication unit when the line becomes available.

3. The communication apparatus according to claim 2, wherein the communication-apparatus-side controller cancels a reservation in a case where the second communication unit is no longer able to wirelessly communicate with the connection-requesting terminal apparatus.

4. The communication apparatus according to claim 2, wherein
the first communication unit receives a connection request from the connection-requesting terminal apparatus at predetermined intervals, and
the communication-apparatus-side controller cancels a reservation in a case where the connection request is no longer received from the connection-requesting terminal apparatus at the predetermined intervals.

5. A communication apparatus comprising:
at least one processor configured to execute:
a first communication unit that wirelessly communicates with a plurality of terminal apparatuses, the number of which is less than or equal to a predetermined maximum number of connections allowed;
a second communication unit that wirelessly communicates with a connection-requesting terminal apparatus that attempts to wirelessly communicate with the first communication unit; and
a communication-apparatus-side controller that disconnects a connection established to wirelessly communicate with an already connected terminal apparatus in accordance with a predetermined rule and prepares a line to which the connection-requesting terminal apparatus is preferentially connected, in a case where the number of connections established for wireless communication via the first communication unit has reached the predetermined maximum number of connections allowed.

6. A terminal apparatus comprising:
at least one processor configured to execute:
a first communication unit that transmits and receives information to and from a communication apparatus via a wireless communication network for which a maximum number of connections allowed is predetermined;
a second communication unit that wirelessly communicates with the communication apparatus when the terminal apparatus attempts to perform wireless communication via the first communication unit; and
a terminal-apparatus-side controller that switches wireless communication performed via the second communication unit to wireless communication performed via the first communication unit, wherein
the second communication unit receives information indicating that wireless communication via the first communication unit is not available from the communication apparatus in a case where the number of connections established in the wireless communication network has reached the maximum number of connections allowed.

7. An image processing system comprising:
an image processing apparatus configured to form an image; and
terminal apparatuses each of which is configured to transmit, via wireless communication, image information used by the image processing apparatus to form an image,
the image processing apparatus including:
at least one processor configured to execute:
a first communication unit that wirelessly communicates with a plurality of terminal apparatuses, the number of which is less than or equal to a predetermined maximum number of connections allowed, among the terminal apparatuses;

a second communication unit that wirelessly communicates with a connection-requesting terminal apparatus that attempts to wirelessly communicate with the first communication unit, among the terminal apparatuses;
a communication-apparatus-side controller that transmits, to the connection-requesting terminal apparatus via the second communication unit, information indicating that wireless communication via the first communication unit is not available in a case where the number of connections established for wireless communication via the first communication unit has reached the predetermined maximum number of connections allowed; and
an image forming unit that forms an image.

8. A communication method comprising:
wirelessly communicating, via at least one processor configured to execute a second communication unit, with a connection-requesting terminal apparatus that attempts to wirelessly communicate with the at least one processor configured to execute a first communication unit which wirelessly communicates with a plurality of terminal apparatuses, the number of which is less than or equal to a predetermined maximum number of connections allowed; and
transmitting, to the connection-requesting terminal apparatus via the at least one processor configured to execute the second communication unit, information indicating that wireless communication via the at least one processor configured to execute the first communication unit is not available in a case where the number of connections established for wireless communication via the at least one processor configured to execute the first communication unit has reached the predetermined maximum number of connections allowed.

* * * * *